Nov. 4, 1952      C. T. MORROW      2,616,681
ANGULAR VELOCITY RESPONSIVE APPARATUS
Filed July 15, 1948
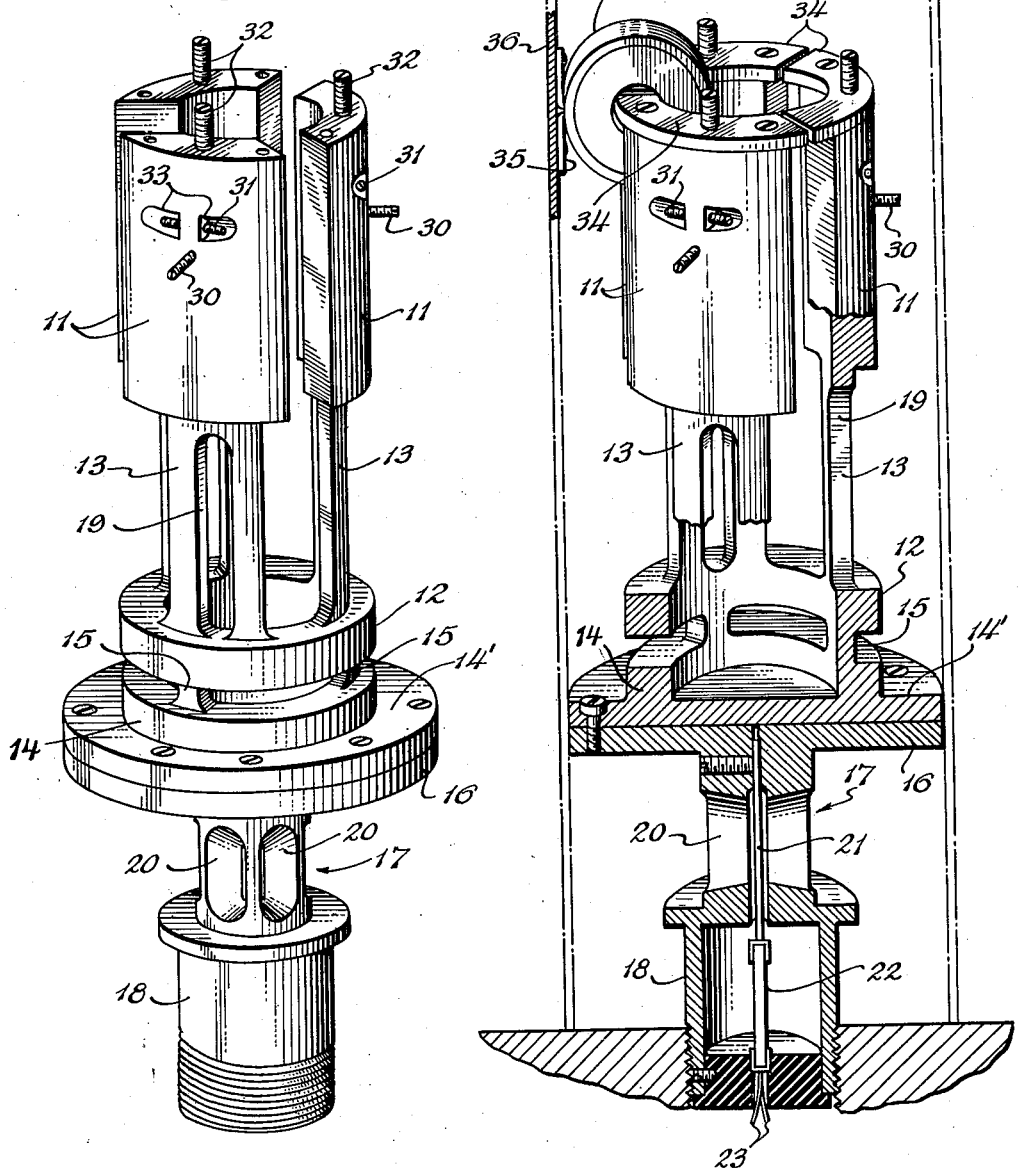
INVENTOR
CHARLES T. MORROW
BY
his ATTORNEY.

Patented Nov. 4, 1952

2,616,681

UNITED STATES PATENT OFFICE 2,616,681

ANGULAR VELOCITY RESPONSIVE APPARATUS

Charles T. Morrow, Great Neck, N. Y., assignor to The Sperry Corporation, Great Neck, N. Y., a corporation of Delaware Application July 15, 1948, Serial No. 38,939

9 Claims. (Cl. 264—1)

The present invention relates to apparatus for indicating and measuring the rate of change of orientation of a body to which it is fixed, and is particularly applicable to means for determining the rate and direction of change of attitude of a movable craft.

The invention relates generally to the class of apparatus described by Joseph Lyman in his Patent No. 2,513,340, dated July 4, 1950, for Angular Velocity Responsive Apparatus, wherein is disclosed an electrically oscillated tuning fork connected by a torsional constraining spring to a base whose rotation is to be measured, and pick-off means for measuring alternating torsional displacement between the tuning fork and the base. The present invention differs from that disclosed by Lyman in that the two-tined tuning fork is replaced by an assemblage of three or more tines or reeds by which certain advantages, not heretofore realized, are attained. With a single pair of tines slight differences of mass or stiffness due to lack of homogeneity of the material may cause a substantial displacement of the node thus causing parasitic oscillations which vitiate the signal from the pick-off. With a larger number of tines such differences of mass and stiffness tend to neutralize one another's effects. Further, if the number of tines exceeds two, they may be planted round a circle to vibrate radially which disposition not only simplifies the processes of construction, but enables one to readily compensate for lack of symmetry and the resulting unwanted vibrations by adjusting balancing screws arranged to move radially, axially and tangentially or circumferentially. Still further, when the tines have a section which is a segment of a cylinder the longitudinal acceleration which may be associated with the normal vibration of a two-tined fork is greatly diminished, if not entirely eliminated, or at least eliminated at certain nodes so that by connecting the pick-off so as to be responsive to vibrations at such nodal points only, unwanted vibrations are not picked up or transmitted.

One of the objects of the present invention is therefore to facilitate the adjustment and balancing of the vibrating tines so as to eliminate unwanted nodes of vibration thereof, a procedure next to impossible in a two tine arrangement.

Another object of the invention is to simplify the construction by which the nodes of vibration may be accurately located on the geometric axis of the body.

A further object of the invention is the reduction or elimination of accelerations of the vibrating masses in a direction parallel to the axis round which the rate of angular rotation is to be measured.

Still a further object of the invention is to simplify and cheapen the construction of the vibrating structure by allowing it to be made in the form of a cylinder or segments of cylinders which can be accurately shaped by machining in a lathe.

Further objects and advantages of the present invention will become apparent from the following specification and drawing in which, Fig. 1 shows the structure of the vibrating element;

Fig. 2 shows the vibrating element, partly in section, with typical means of maintaining the vibrations and detecting the torsional displacements.

Referring to Fig. 1, each of the three vibrating tines consists of a massive upper portion 11 united to a ring 12 by a flexible section or reed 13. The flexibility of the sections 13 is increased by turning them in a lathe so as to have a smaller radial thickness than the parts 11 and by piercing openings or windows as shown at 19. The ring 12 is connected to a base 14 by three short flexible columns or spokes 15 spaced 120° apart, as shown, each being symmetrical about the median plane of the tine above it. The base, in the embodiment illustrated, is provided with a cylindrical reentrant portion, the cylindrical walls of which are aligned with the inner cylindrical surface of ring 12, and base 14 also comprises the integral flange 14'. Alternatively, the base 14 may be drilled to provide an inner cylindrical passage extending completely therethrough. All three tines with their masses 11 and flexible portions 13, the ring 12, the base ring 14 and the connecting columns 15 are preferably turned out of a single piece of elastic material, such as steel, and, partly for convenience in manufacture, the inside diameter may be the same for all the parts so that the inside of the whole assembly can be machined in effect merely by straight drilling from one end or, if desired, from either end and without undercutting. Moreover this construction has the added advantage of minimizing the longitudinal acceleration of the center of gravity of the vibrating masses. The radial openings between the tines 11, also the windows 19, and the spaces between the columns 15 are subsequently formed by milling operations.

The flange 14' on the base is mounted by screws on a concentric flange 16 which forms one end of an elastic torsional means or constraining spring 17. The other end of the torsion spring is connected to a boss 18 which is secured to a mounting which may comprise the frame of the airplane or other vehicle whose rate of turn is to be measured.

The torsion spring 17 as shown in the drawing is of tubular shape having an inside diameter substantially less than that of the tines. The tube is perforated by preferably six radial openings 20 whereby it is rendered flexible to torsion round the vertical axis but very rigid to resist bending round any other axis.

The pick-off means by which angular displacement between the upper and lower ends of the torsion spring is to be detected and measured may be of any known type, for instance, as disclosed by Lyman in Patent No. 2,513,340 to which reference has already been made. As shown in the section of Fig. 2 the flange 16 carries a stiff rod 21 firmly fixed to the center of the flange at one end. A crystal 22 of Rochelle salt or other piezoelectric substance is clamped at one end in the boss 18, while the other end is connected to rod 21. Any relative rotation between flange 16 and boss 18 therefore causes rod 21 to twist the crystal, so producing electric charges on its surfaces. These charges are picked up by electrodes, on the surfaces of the crystal, and thence conducted by shielded insulated leads 23 to an amplifier and phase detector, whereby the amplitude and phase of the alternating charges on the crystal may be used to energize a voltmeter. The indications of the voltmeter against a suitably calibrated dial are the measure of the rate and direction of turning of the base.

In order to eliminate unwanted nodes of vibration, the tines 11 must be balanced longitudinally, radially and circumferentially so that the vibration is truly radial with nodes exactly 120° apart and at or above the three connecting columns 15. For this purpose, I provide on each tine, a radial adjusting screw 30, a circumferential adjusting screw 31 and an axial screw 32. The screws 31 are tapped into the solid portion separating two recesses 33 machined in the face of the tine. Lock nuts, not shown, may be added if necessary to lock the screws after adjustment has been made. However, it is to be understood that if lock nuts are employed to secure the balancing screws 30, 31, and 32, against movement from their adjusted position, the added mass of the lock nuts must be taken into consideration in fabricating the tines 11 in order that they will balance both dynamically and statically. It will be observed that the general form of construction makes an exact similarity in the shape of the three tines comparatively easy to attain and the balancing screws above referred to may therefore be small as they are only needed to correct such lack of symmetry as may be due to variations in the density or elasticity of the material of which the tines are composed, or to small errors in machining.

One form of means for maintaining the tines in vibration is shown in Fig. 2 and consists of coils 37 placed in the spaces between the tines with their axes horizontal and embracing the ends of pole pieces 34 of soft iron or other suitable magnetic material screwed onto the top of the massive end 11 of each tine. The pole pieces are in the form of segments of circles, each segment subtending substantially less than 120° so as to allow of a separating air gap between adjacent pole pieces.

For the sake of clearness, only one coil 37 is shown in Fig. 2, but it will be understood that three such coils are to be used, one between every two tines and each surrounding one end of two pole pieces. The three coils are carried by brackets 35 from the top of a cylindrical case surrounding the instrument and shown in section at 36.

The windings of the coils are connected in series, or in parallel and may be excited from a source of alternating current electricity. When current flows through the coils and magnetizes the pole pieces, these are attracted to one another and all three tines are simultaneously flexed towards the center. When the current next falls to zero, the tines spring out again. By tuning the tines to twice the frequency of the alternating current, a state of resonance is produced and the vibration of the tines will be maintained with a minimum loss of energy.

If preferred, the tines may be made to control a source of direct current so as to be self oscillating. For this purpose, pickup devices of any well-known type may be attached to the flexible portion 13 of one or more tines just above the ring 12. These pickup devices, which may be crystals of Rochelle salt, are used to produce an interrupted voltage corresponding to the mechanical vibration of the tines; they are connected to the input circuit of an amplifier, whose output circuit is connected to the driving coils 37 all after the manner disclosed by Lyman's Patent No. 2,513,340.

So long as the boss 18 does not rotate round its axis, there will be no angular displacement between the boss and the flange 16, but when boss 18 is rotating, the flange 16 will have the same rotation and in addition will have a small superposed oscillation about the same axis with an amplitude proportional to its mean rate of rotation. The amplitude of this oscillation is measured by the torsional pick-off device already described herein.

In the case of a simple two-pronged tuning fork, the primary vibration may be attended by spurious vibrations at the operating frequency. Such spurious vibrations, if communicated to the torsional pickup device, vitiate the signals therefrom and cause errors in the indicated angular velocity. I have found that a three-tined device as described herein is inherently less prone to spurious vibrations than a two-tined fork and that such vibrations may be readily avoided by adjustment of the screws 30, 31, 32, as explained. Moreover, since such vibrations may be caused by small departures from perfect symmetry, the construction described, which makes ideal symmetry easier of attainment, has a further advantage.

Coupling of any spurious vibration to the pickup is further reduced by the insertion of the massive ring 12 between the flexible parts 13 of the tines proper and the three columns 15. When the tines have been properly balanced by the screws 30, 31 and 32 the nodal points will lie at the middles of the columns 15. These columns are made thin so as to bend radially with comparative ease, while the massive parts 12 and 14 above and below the columns help to filter out the unwanted vibrations. In view of the location of the nodal points, I choose to define as the nodal section of the present apparatus that portion thereof comprising ring 12, spokes 15, and base 14.

Since many changes could be made in the above construction and many apparently widely different embodiments of this invention could be made without departing from the scope thereof, it is intended that all matter contained in the above description or shown in the accompanying drawing shall be illustrative and not in a limiting sense.

What is claimed is:

1. Apparatus responsive to the angular velocity or rate of turn of a body, comprising a base portion, a torsionally elastic coupling securing said base portion to the body, at least three vibratory matched masses disposed symmetrically about the axis about which turn is being measured, elastic means connecting each mass to said base portion whereby each mass will vibrate radially toward and away from said axis, each mass having thereon three adjustable members, adjustable respectively radially, axially and circumferentially, whereby spurious vibrations transmitted to the base portion are reduced to a minimum, and means responsive to relative torsion between said base portion and body about said axis for indicating the rate and direction of rotation of said body about said axis.

2. Apparatus responsive to rate of rotation of a mounting about an axis comprising in combination a sensitive element consisting of three reed-shaped masses disposed symmetrically about said axis and adapted to vibrate radially towards and away from said axis, means for maintaining said reeds in synchronous rapid vibration to thereby retain their symmetric distribution about said axis, a nodal section including a base portion 24, said nodal section forming a common platform for said reeds and being integral therewith, torsional constraining means connecting said nodal section to said mounting, and means responsive to variations in torsion between said base portion and said mounting about said axis for detecting and indicating the rate of rotation of said mounting about said axis.

3. Apparatus as defined in claim 2 wherein the nodal section is formed partly as axially spaced concentric cylinders interconnected by spokes and the masses are formed partly as segments of cylinders concentric with said first-mentioned cylinders.

4. Apparatus as defined in claim 2 wherein the nodal section comprises a ring connecting the resilient ends of the three reeds, a flanged member and three spokes connecting said ring with said flanged member at nodal points.

5. Apparatus as defined in claim 2 in which the nodal section and sensitive element are composed of cylinders and segments of cylinders respectively all of which have the same inside diameter.

6. Apparatus responsive to the rate of rotation of its mounting about an axis comprising in combination, a sensitive element comprising three times disposed symmetrically and in spaced relation about said axis and adapted to rapidly vibrate radially with respect thereto, a nodal section integral with said tines, said nodal section including a ring providing a common platform supporting said tines and elastically joined to each of said tines, a base portion, and spokes mounting said ring on said base portion and positioned at the nodes of minimum vibration in an axial direction, so that undesired vibrations are not transmitted, motive means for initiating and sustaining vibration of said tines at their natural period radially toward and away from said axis, elastic torsional means connecting said base portion to the mounting of said apparatus, and signal means connected between said base portion and said mounting providing a signal proportional to the rate and direction of rotation of said mounting about said axis.

7. Apparatus as defined in claim 6 wherein each of said tines are provided with pole pieces extending into the spaces therebetween, and wherein said motive means comprises three windings disposed in the spaces between each of said tines and embracing the extending portions of said pole pieces.

8. Apparatus as defined in claim 2 wherein the nodal section comprises a first ring joining the resilient ends of the three reeds, a second ring integral with said base portion, and three spokes symmetrical about the median planes of said three reeds for connecting said first ring to said second ring.

9. Apparatus for detecting and measuring the angular velocity of a body about an axis, said apparatus comprising at least three movable masses symmetrically disposed about said axis, a nodal section forming a common platform for said masses, elastic means connecting each of said masses with said nodal section, means for rapdly and synchronously vibrating said masses at their natural period radially towards and away from said axis, elastic torsional means connecting said nodal section with said body for permitting selective angular movement about said axis between said nodal section and said body, and signal generating means effectively connected between said nodal section and said body for producing a signal proportional to the differences in orientation therebetween.

CHARLES T. MORROW.

REFERENCES CITED

The following references are of record in the file of this patent:

UNITED STATES PATENTS

| Number | Name | Date |
|---|---|---|
| Re. 22,409 | Lyman et al. | Dec. 21, 1943 |
| 2,193,910 | Wilson | Mar. 19, 1940 |
| 2,338,732 | Nosker | Jan. 11, 1944 |
| 2,359,245 | Ritzmann | Sept. 26, 1944 |
| 2,513,340 | Lyman | July 4, 1950 |

FOREIGN PATENTS

| Number | Country | Date |
|---|---|---|
| 157,606 | Germany | Jan. 10, 1905 |
| 210,708 | Germany | June 8, 1909 |